United States Patent [19]

Le Sergent et al.

[11] Patent Number: 4,952,225
[45] Date of Patent: Aug. 28, 1990

[54] METHOD OF MAKING AN INTERNALLY-DOPED TUBE OF TRANSPARENT GLASS, IN PARTICULAR FOR MANUFACTURING RARE-EARTH-DOPED OPTICAL FIBERS

[75] Inventors: Christian Le Sergent, Marcoussis; Josiane Ramos, Bondoufle; Gilles Barre, Saint Michel Sur Orge, all of France

[73] Assignees: Societe Anonyme dite: Compagnie Generale D'Electricite; Electricite de France Service National, both of Paris, France

[21] Appl. No.: 257,666

[22] Filed: Oct. 14, 1988

[30] Foreign Application Priority Data

Oct. 16, 1987 [FR] France ............... 87 14286

[51] Int. Cl.⁵ .................. C03B 37/014; C03B 37/018
[52] U.S. Cl. ......................... 65/312; 65/3.11; 65/30.13; 65/60.2
[58] Field of Search ............. 65/3.12, 3.2, 3.14, 65/3.11, 60.5, 30.13, 18.2, 60.2

[56] References Cited

U.S. PATENT DOCUMENTS

| | | | |
|---|---|---|---|
| 4,165,224 | 8/1979 | Erven et al. | 65/3.12 |
| 4,312,653 | 1/1982 | Schneider et al. | 65/3.12 |
| 4,414,164 | 11/1983 | Roba et al. | 65/3.12 |
| 4,518,407 | 5/1985 | Black et al. | 65/3.12 |
| 4,848,998 | 7/1989 | Snitzer et al. | 65/3.11 |
| 4,859,222 | 8/1989 | Bauch et al. | 65/3.2 |

FOREIGN PATENT DOCUMENTS

| | | | |
|---|---|---|---|
| 8701110 | 2/1987 | European Pat. Off. | |
| 2284125 | 9/1975 | France | |
| 0025230 | 3/1981 | France | |
| 0026625 | 4/1981 | France | |
| 0243010 | 10/1987 | France | |
| 8135148 | 8/1983 | Japan | 65/3.12 |
| 2067181 | 9/1980 | United Kingdom | 65/3.12 |

*Primary Examiner*—Kenneth M. Schor
*Attorney, Agent, or Firm*—Sughrue, Mion, Zinn, Macpeak & Seas

[57] ABSTRACT

A mist is formed by an ultrasonic generator (5) from a liquid solution containing a dopant, and the mist is inserted into the tube blank to be doped (4) by means of a flexible pipe (2) in order to deposit microdrops on the inside surface of said tube blank. The flexible pipe is withdrawn progressively so that deposition takes place along the entire length of the tube blank. The deposit is dried and a new layer of glass is deposited thereon. The dopant from the deposit is heat diffused into the glass of the tube blank and of the new layer of glass. The invention is particularly applicable to fabricaitng rare-earth-doped silica preforms for the purpose of drawing optical fibers that can be used to constitute lasers or sensors.

11 Claims, 2 Drawing Sheets

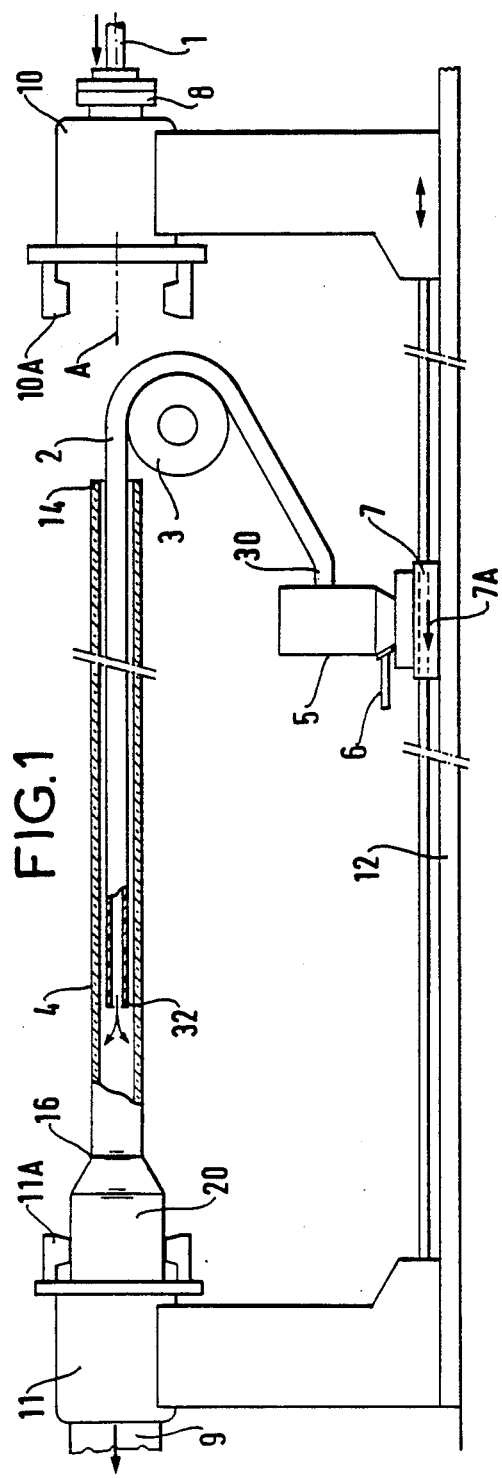
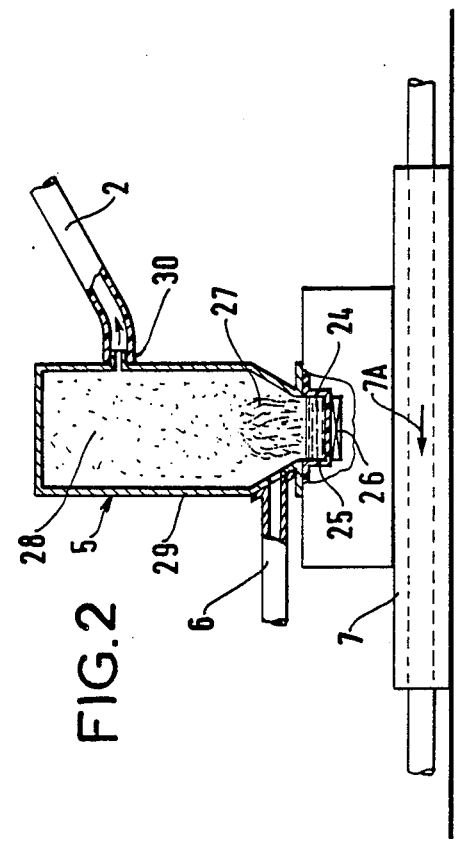

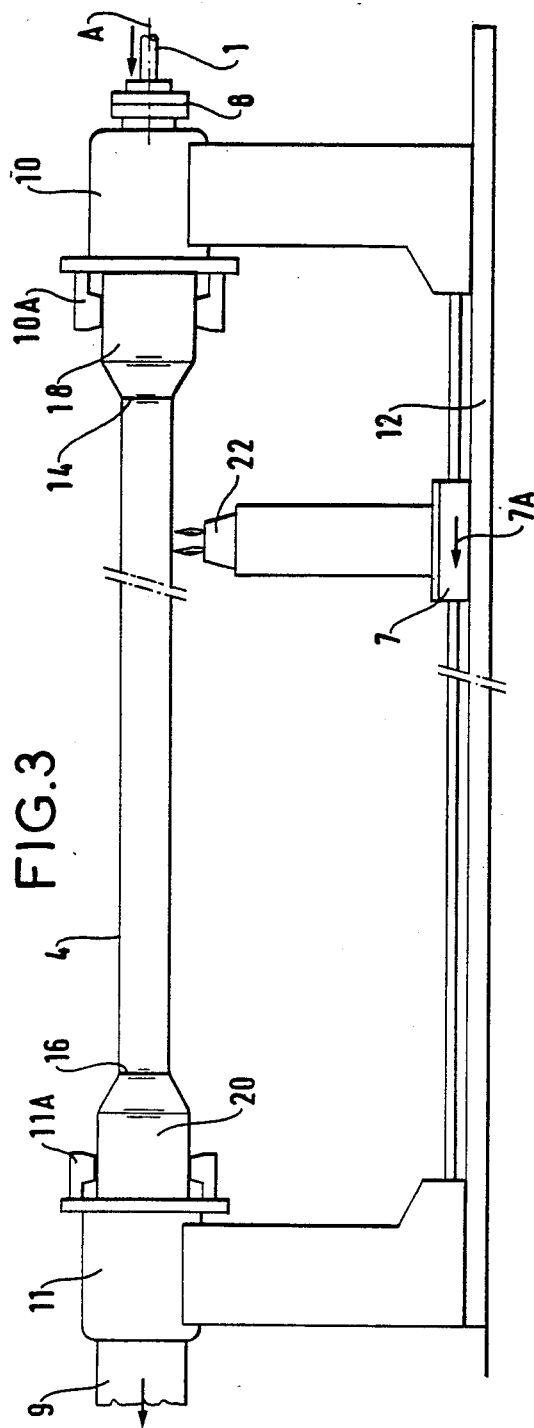
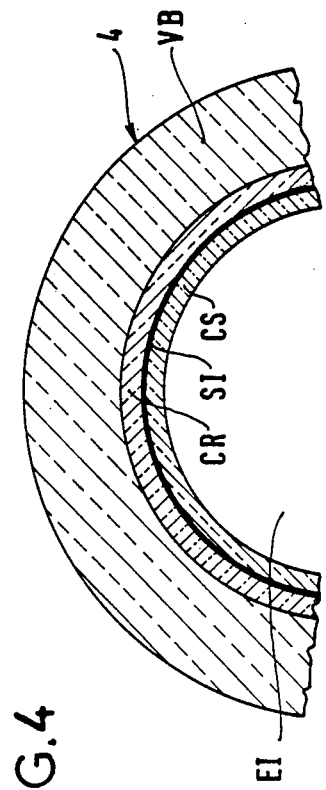
FIG.3
FIG.4

METHOD OF MAKING AN INTERNALLY-DOPED TUBE OF TRANSPARENT GLASS, IN PARTICULAR FOR MANUFACTURING RARE-EARTH-DOPED OPTICAL FIBERS

BACKGROUND OF THE INVENTION

The present invention relates in general to internally doping a tube of glass, i.e. incorporating one or more dopants in an inside layer of the tube, with the term "dopant" being used herein to designate any material capable of locally modifying the characteristics of the glass. The invention is particularly applicable to cases where it is not desired or not possible to include a volatile precursor of such an element in a mixture of reaction gases. The invention then meets a need which is currently felt in the manufacture of optical fibers. Various dopants may be used in such manufacture for the purpose of locally modifying the optical characteristics of a tube of glass which is subsequently hot-collapsed in order to transform it into a preform which can be hot-drawn in order to provide a fiber. When the dopant used has a volatile precursor, it is generally easy to include the precursor into the mixture of reaction gases from which the dopant can subsequently be incorporated in the glass by conventional methods. However, these methods are no longer applicable when the dopant to be incorporated does not possess a volatile precursor. This applies to rare earths such as neodymium or erbium. When the invention is applied to the manufacture of optical fibers, the glass in which the dopant is to be incorporated is silica glass.

In optical fiber manufacture, the conventional doping precursors used in the manufacture of preforms by the so-called prior art "MCVD" method have vapor pressures of a few thousand Pascals even at ambient temperature, thereby making it possible in a first prior art method to incorporate them by bubbling a carrier gas through a reactor in order to constitute said mixture of reaction gases. However, the compounds of rare earths which can be used for manufacturing optical fibers for constituting lasers or sensors have very low vapor pressures even at temperatures close to their melting points, for example:

$NdCl_3$ 3.52 Pascals at 820° C.; and
$ErCl_3$ 14.84 Pascals at 830° C.

This first method including said bubbling is then no longer usable. The first preforms to be doped with rare earths were made using a second prior art method referred to as the "doping chamber" method (see document No. 1 listed in the bibliography at the end of the description). When this method is used, the incorporation of the dopant is not as uniform longitudinally as could be desired.

A third prior art method is described in European patent application No. 0 025 230, but for incorporating dopants other than rare earths. This document proposes incorporating the dopant in a precursor which is dissolved in a liquid carrier, mixing the precursor and the liquid carrier with a precursor for silica dissolved in a liquid carrier, conveying this liquid mixture under pressure via a delivery tube to a point of application which is displaceable inside a glass tube blank having an inside layer into which the dopant is to be incorporated, while also conveying a liquid reagent under pressure to the same point for the purpose of reacting chemically with said precursors in order to form the dopant and silica, spraying said precursors and their carrier liquids together with said reagant towards the inside surface of the glass tube blank, and displacing the point of application so as to sweep said inside surface, thereby forming a layer of doped glass at low temperature, with the liquid carriers subsequently being elminated by drying.

This third prior art method does not seem to be usable in practice since the layer of glass formed contains such a quantity of said liquid carriers at the moment of formation that when the layer is dried and subsequently consolidated by heating, it does not achieve acceptable optical qualities, in particular concerning transparency.

A fourth prior art method in the same technical field includes various operations which are common, at least in some respects, both to said prior art method and to the method of the present invention, at least in a typical implementation of the invention.

These two methods begin with a tube blank which is not doped or which is at least not completely doped with the dopant to be incorporated.

Said common operations are the following:

making a tube blank constituted by glass and having a length between a first end and a second end, and having an inside surface about an inside space;

making a liquid doping liquor constituted by a volatile carrier liquid and containing a dopant suitable for performing said doping;

depositing said dopant in liquid form by depositing a quantity of said doping liquor on the inside surface of said tube blank, with the quantity deposited being small enough to prevent said liquor from running after being deposited;

drying said inside surface after depositing said dopant by evaporating said liquid carrier;

depositing a covering layer of glass on said inside surface of said tube blank after said operation of drying said surface; and heating-diffusion, said operation comprising heating said tube blank and said covering layer after said layer has been deposited at least partially in order to raise said tube and said layer to a diffusion temperature for diffusing said dopant into the glass.

In this fourth prior art method, said operation of depositing a covering layer takes place at a temperature such as to simultaneously constitute said operation of heating-diffusion. Said operation of depositing said dopant takes place in two stages. In a first stage a uniform porous inside layer (a "soot") is formed on the inside surface of the tube blank. In the second stage, said porous layer is impregnated with said doping liquor which is thus held uniformly over all of said surface. After drying, heating transforms said porous layer into a layer of glass containing the dopant. This fourth prior art method is described in document No. 2.

It suffers from the following drawbacks:

Impregnating the porous layer requires the tube blank to be removed from the glass-makers' lathe onto which the tube was previously mounted for prior deposition operations, in particular for forming said porous layer. The tube then needs to be remounted on the lathe for subsequent deposition operations or at least for the collapsing operation which transforms the tube into a preform from which an optical fiber can be drawn.

This gives rise to the difficult and expensive operation of dismounting and remounting the tube. As a result there is above all a danger of polluting the inside of the tube, in particular by soots which are deposited at the downstream end of the tube during earlier depositing operations. These soots are formed from a mixture of reaction gases running along the tube for depositing a layer of glass therein. They are constituted by particles which are not deposited at appropriate locations for forming said layer of glass and which have been entrained downstream by the remainder of the mixture of reaction gases. Reinserting them into the tube, even in very small quantities, while it is being dismounted or remounted, seriously degrades the optical qualities of the optical fiber which will eventually be made.

The objects of the present invention include, in particular, making it possible to introduce a dopant into a glass tube from one end only thereof, to avoid dismounting the tube once it has been mounted on a glassmakers' lathe, to avoid the danger of polluting said tube when performing said incorporation from the other end of the tube if said other end has already been polluted, to provide longitudinally uniform distribution of the dopant, and finally, when the tube is intended to be collapsed to constitute a preform from which an optical fiber is to be drawn, to make it possible to cheaply obtain an optical fiber having good optical qualities.

SUMMARY OF THE INVENTION

To satisfy these objects, the present invention provides a method which, at least in said typical case, comprises the above-mentioned common operations, and which differs from the fourth above-described prior art method in that said operation of depositing said dopant itself comprises the following operations:

making a mist of said doping liquor in order to obtain a doping mist constituted by droplets in suspension in a carrier gas;

placing a mist delivery tube in said inside space of said tube blank, said mist delivery tube having an inlet end outside said tube blank, penetrating into said tube from said first end thereof, and extending up to an outlet end situated in said inside space;

feeding said mist delivery tube via said inlet end thereof to cause it to emit said doping mist from said outlet end thereof in said inside space of the tube blank in such a manner that said dopant is deposited by depositing droplets of said mist on said inside surface; and displacing said mist delivery tube in controlled manner inside said tube blank while maintaining said feed in such a manner that said outlet end from said mist delivery pipe runs along the length of said starting tube, and said dopant is deposited over the entire inside surface thereof.

According to the invention, it has been discovered that depositing the doping liquor from such a mist ensures that a microscopically uniform distribution of said liquor is maintained on said inside surface until said surface has been dried.

In the context of the present invention, it is possible also to adopt the following sometimes-preferred dispositions:

said operation of making a mist is performed outside said tube blank in such a manner as to provide a mist whose liquid component is constituted by droplets whose diameters are less than about 12 micrometers, and more particularly having diameters lying in the range about 1 micrometer to about 5 micrometers;

when said mist delivery tube is put into place, said outlet end thereof is placed at said second end of said tube blank;

this disposition has the effect that said controlled displacement of said mist delivery tube causes said outlet end to pass from said second end to said first end of the tube blank, in such a manner that said droplets are deposited from said doping mist at all times in a portion of the length of said tube blank in which said mist delivery tube is no longer present and can therefore no longer disturb the deposit, e.g. by contacting and sweeping said inside surface;

said operations of depositing said dopant, of drying the inside surface of the tube blank, and of depositing a covering layer on said surface are performed on a glassmakers' lathe without removing the tube blank, and said operation of depositing said dopant includes an additional operation of removing said mist delivery tube after said controlled displacement operation in order to avoid interfering with said operation of depositing a covering layer;

said mist delivery tube is a flexible pipe, thereby enabling said operations of putting said pipe into place, of displacing it in controlled manner, and of removing it to be performed in a limited space;

when said tube blank is constituted, over at least a portion of its thickness, by a relatively poorly meltable base glass, said method further includes a prior operation of depositing a reception layer constituted by a glass which is more easily melted than said base glass. The free surface of said layer then constitutes said inside surface. The glass of said covering layer is then likewise chosen to be more easily melted than said base glass. Said operations of depositing said dopant and of drying said inside surface are performed between said operations of depositing said reception layer and of depositing said covering layer. And said operations of depositing said covering layer and/or of heating-diffusion are performed at temperatures which are high enough to vitrify at least said covering layer and to cause said dopant to diffuse in said layer and in said reception layer. Said temperatures are simultaneously low enough to conserve the rigidity of said base glass. A continuous vitrious mass is thus realized without deforming the tube blank;

in a usual implementation of the present invention, each of said operations of depositing said reception layer and of depositing said covering layer comprises the following operations which are known per se: a mixture of reaction gases suitable for reacting when heated to a deposition temperature is caused to run along said inside space of said tube blank from an upstream end to a downstream end thereof, with a glass deposit then being formed to constitute said layer to be deposited; and simultaneously, at least one heating pass is performed during which heater means run along the length of said tube blank in order to heat, at each instant, a portion of said length to a deposition temperature and cause said glass deposit to take place in said portion, such that at the end of said heating pass said deposit has been formed over the entire length of said tube. In this case the soot is usually deposited at the downstream end of said tube as explained above. That is why said upstream end of the tube blank is then chosen to constitute said first end via which said mist delivery tube penetrates into the tube blank, thus ensuring that insertion of the delivery tube cannot entrain said soot into said tube blank;

when the present invention is applied to manufacturing optical fibers, said base glass is conventionally silica, and said reception and covering layers are constituted by silica-based composite glasses. The said operation of depositing a covering layer is performed in known manner at a deposition temperature which reaches said diffusion temperature such that said operation simultaneously constitutes said heating-diffusion operation. As for the drying operation, it is performed under controlled and progressive heating to a drying temperature which is less than said diffusion temperature so as to avoid damaging the thin discontinuous layer of dopant which results from said volatile solvent evaporating. The solvent is generally water.

BRIEF DESCRIPTION OF THE DRAWINGS

An implementation of the present invention in the context of the description given above is given below by way of non-limiting example and with reference to the accompanying diagrammatic figures. When the same item appears in several figures it is designated therein by the same reference symbol.

The implementation given by way of example includes the dispositions mentioned above as sometimes-preferred being dispositions. It should be understood that the items mentioned may be replaced by other items performing the same technical functions.

FIG. 1 is an elevation view of a glass-makers' lathe on which a tube blank is mounted having an inside surface on which an operation of depositing a dopant is to be performed in accordance with the present invention.

FIG. 2 is a section on a larger scale through a mist generator shown in FIG. 1

FIG. 3 is an elevation view of the FIG. 1 glass-makers' lathe during an operation of depositing a covering layer inside said tube blank.

FIG. 4 is a cross-section on a larger scale through an angular sector of a doped tube obtained in accordance with the present invention from said tube blank.

MORE DETAILED DESCRIPTION

As shown in FIGS. 1 and 3, said glass-makers' lathe comprises an upstream headstock 10 and a downstream headstock 11 provided with respective upstream and downstream jaws 10A and 11A for holding a silica tube such as 4 which constitutes said tube blank and for rotating it about a horizontal axis A. This tube is held by the jaws via silica connection sleeves which are welded to its upstream and downstream ends 14 and 16, respectively.

In FIG. 1, an upstream connection sleeve 18 has been removed in order to enable said mist delivery tube to be inserted therein with said tube being a flexible pipe and being deflected around a pulley 3.

It would however be possible to avoid dismounting said sleeve by passing the pipe through the rotary inlet bearing 8 used for delivering said mixtures of reaction gases and passing through the upstream headstock 10. If there is room, it would also be possible to use a rigid mist delivery tube passing through said rotary bearing of said headstock.

The glass-makers' lathe also includes a table 12 provided with a carriage 7 which moves longitudinally, i.e. parallel to the axis A.

The inlet and outlet for said mixtures of reactive gases are represented by arrows 1 and 9.

As shown in FIGS. 1 and 2, said doping mist is inserted into the tube blank 4 beginning from its downstream end 16 on leaving the outlet 32 from the mist delivery pipe 2. The inlet end 30 of the pipe is fed, for this purpose, by a mist generator 5.

The generator comprises a tank 25 which contains said doping liquor 24, e.g. an aqueous solution of erbium or neodymium chloride. An ultrasonic transducer 26 is disposed at the bottom of the tank and serves to project droplets forming an agitated cluster called a geyser 27. For example, the transducer may operate at a frequency of 850 kHz and at a power of 150 W.

Said carrier gas is inserted at 6 and forms said mist 28 inside the enclosure 29 of the generator 5.

After the flexible mist delivery pipe 2 has been put into place inside the tube blank 4, said controlled displacement is obtained by fixing the mist generator 5 on the carriage 7 which then moves in the direction of arrow 7A in order to withdraw the pipe 2 progressively.

As shown in FIG. 3, said operation of depositing a covering layer CS (see FIG. 4) is performed by causing an appropriate mixture of reaction gases to arrive via the rotary bearing 18 and by performing a pass with heater means constituted by an oxygen and hydrogen torch 22. This torch is fixed for this purpose to the carriage 7 after the mist generator 5 has been removed therefrom.

Other operations of depositing layers of glass are performed in similar manner both before and after said operation of depositing the dopant. One such operation is used, in particular, for depositing said reception layer CR.

Said layer is shown in FIG. 4, in which the references VB, SI, and EI designate the base glass, said inside surface, and said inside space.

The dopant is deposited on said reception layer which is sufficiently meltable or reactive to readily incorporate the selected dopant(s). More precisely, deposition takes place as follows: once the layer CR has been deposited, the tube blank 4 is left waiting for 15 minutes to 30 minutes with a stream of oxygen flowing at 120 liters per hour (l/h). The flexible pipe 2 which is made of polytetrafluoroethylene is then inserted into the tube 4 after which it is withdrawn at a speed which is determined as a function of the quantity of dopant to be deposited. Microdrops whose diameters lie in the range 1 micrometer to 5 micrometers adhere to the wall constituting said inside surface SI. Said drying operation, i.e. in this case a dehydration operation, takes place at between 200° C. and 600° C. with the torch 22 going back-and-forth while a stream of oxygen and chloride flows along the tube 4, with chlorine being the majority component.

The method of the invention is suitable for incorporating any dopant which is difficult to put into a vapor phase but which is suitable for being put into liquid solution, at least in the form of a precursor. It also makes co-doping convenient to perform. It is incorporated in the usual "MCVD" deposition method used for fabricating conventional preforms. It takes place after some of the core layers, or cladding layers for single mode fibers, have been deposited.

BIBLIOGRAPHY

The above-mentioned documents are the following:

Document No. 1

Poole et al: Fabrication and characterization of low-loss optical fibers, Journal of Lightwave Technology, Vol. LT-4, No. 7, July 1986.

Document No. 2

J. E. Townsend, S. B. Poole, and D. N. Payne, Solution-doping technique for fabrication of rare-earthdoped optical fibers, Electronics Letters, Mar. 26, 1987, Vol. 23, No. 7.

We claim:

1. A method of making an internally doped tube of transparent glass, said method comprising the following operations:

making a tube blank of a base glass having a length between a first end of said tube blank and a second end, and having an inside surface surrounding an inside space;

making a liquid doping liquor comprising a volatile carrier liquid and a rare-earth dopant;

depositing said dopant in liquid form by depositing a small quantity of said doping liquor on the inside surface of said tube blank, such that the liquor remains in place on said inside surface after being deposited;

drying said inside surface after depositing said dopant by evaporating said liquid carrier;

depositing a covering layer of glass on said inside surface of said tube blank after said operation of drying said surface; and heating said tube blank and said covering layer after said layer has been deposited at least partially in order to raise said tube blank and said layer to a diffusion temperature and diffusing said dopant into the glass of said tube and said covering layer;

wherein said operation of depositing said dopant comprises the following sub-operations:

making a mist of said doping liquor in order to obtain a doping mist constituted by droplets in suspension in a carrier gas;

placing an outlet end of a mist delivery tube in said inside space of said tube blank, with an inlet end of said mist delivery tube outside said tube blank;

feeding said doping mist to said mist delivery tube via said inlet end thereof to cause said delivery tube to emit said doping mist from said outlet end thereof in said inside space of the tube blank in such a manner that said dopant is deposited by depositing droplets of said mist on said inside surface; and displacing said mist delivery tube in controlled manner inside said tube blank while maintaining said feed in such a manner that said outlet end from said mist delivery pipe moves along the length of the starting tube blank, and said dopant is deposited over the entire inside surface thereof.

2. A method according to claim 1, wherein said operation of making a mist is performed outside said tube blank in such a manner as to provide a mist whose liquid component is constituted by droplets whose diameters are less than about 12 micrometers.

3. A method according to claim 2, wherein said droplets have diameters lying substantially in the range 1 micrometer to 5 micrometers.

4. A method according to claim 1, wherein when said mist delivery tube is put into place, said outlet end thereof is placed at said second end of said tube blank; said controlled displacement of said mist delivery tube causes said outlet end to pass from said second end to said first end of the tube blank, in such a manner that said droplets are deposited from said doping mist at all times in a portion of the length of said tube blank in which said mist delivery tube is no longer present.

5. A method according to claim 4, wherein said operations of depositing said dopant, of drying the inside surface of the tube blank, and of depositing a covering layer on said surface are performed on a glass-makers' lathe without removing the tube blank, said operation of depositing said dopant including an additional operation of removing said mist delivery tube after said controlled displacement operation in order to avoid interferring with said operation of depositing said covering layer.

6. A method according to claim 5, wherein said mist delivery tube is a flexible pipe, thereby enabling the sub-operations of putting said pipe into place, of displacing it in controlled manner, and of removing it to be performed in a limited space.

7. A method according to claim 5, wherein said tube blank is constituted, over at least a portion of its thickness, by a base glass;

said method further including the step of depositing a reception layer on the inside surface of the tube blank for forming said inside surface prior to depositing said dopant, said reception layer being consituted by a glass which is more easily melted than said base glass;

the glass of said covering layer being likewise more easily melted than said base glass;

said operations of depositing said dopant and of drying said inside surface being performed between said operations of depositing said reception layer and of depositing said covering layer; and said operations of depositing said covering layer and heating and diffusion being performed at temperatures which are high enough to vitrify at least said covering layer and to cause said dopant to diffuse in said covering layer glass and in said reception layer glass, said temperatures being simultaneously low enough to conserve the rigidity of said base glass.

8. A method according to claim 7, wherein said operations of depositing said reception layer and of depositing said covering layer each comprise the following sub-operations;

a mixture of reaction gases suitable for reacting when heated to a deposition temperature is caused to travel along said inside space of said tube blank from an upstream end to a downstream end thereof, with a glass deposit then being formed to constitute said layer to be deposited; and simultaneously, at least one heating pass is performed during which a heating means travels along the length of said tube blank in order to heat, at each instant, a portion of said length to a deposition temperature and cause said glass deposit to take place in said portion, such that at the end of said heating pass said deposit has been formed over the entire length of said tube blank, so that soot may be deposited downstream from said mist delivery tube, said soot being constituted by particles which results from said heating of said mixture of reaction gases and which have not been deposited on the length of said non-doped tube blank, and which have been entrained by the remainder of said mixture of reaction gases; and wherein said upstream end of the tube blank constitutes said first end thereof through which said mist delivery tube enters into the tube blank, thus ensuring that insertion of the mist delivery tube cannot entrain said soot into said tube blank.

9. A method according to claim 8, wherein said base glass is silica, and said reception and covering layers are constituted by silica-based composite glasses.

10. A method according to claim 9, wherein said operation of depositing a covering layer is performed at a deposition temperature which reaches said diffusion temperature such that after said partial deposition of covering layer, simultaneously heating and diffusion occurs.

11. A method according to claim 1, wherein said drying operation is performed at a drying temperature which is less than said diffusion temperature.

* * * * *